(12) United States Patent
Klinger et al.

(10) Patent No.: US 8,245,633 B2
(45) Date of Patent: Aug. 21, 2012

(54) BREAD BAKING SUPPORT AND ASSOCIATED APPLIANCE

(75) Inventors: Michel Klinger, Stosswihr (FR); Lionel Reyes, Echevannes (FR)

(73) Assignee: SEB S.A., Ecully (FR)

( * ) Notice: Subject to any disclaimer, the term of this patent is extended or adjusted under 35 U.S.C. 154(b) by 1274 days.

(21) Appl. No.: 11/945,428

(22) Filed: Nov. 27, 2007

(65) Prior Publication Data

US 2008/0164245 A1    Jul. 10, 2008

(30) Foreign Application Priority Data

Jul. 30, 2007  (FR) ...................................... 07 05556

(51) Int. Cl.
*A21B 5/00* (2006.01)
*A47J 37/01* (2006.01)

(52) U.S. Cl. ....... 99/441; 99/384; 220/573.1; 220/573.5

(58) Field of Classification Search ........................ None
See application file for complete search history.

(56) References Cited

U.S. PATENT DOCUMENTS

| | | | | |
|---|---|---|---|---|
| 519,580 A | * | 5/1894 | Kelsey | ............................. 99/448 |
| 780,253 A | * | 1/1905 | Yore | ............................. 425/308 |
| 1,583,295 A | * | 5/1926 | Larsen | ...................... 126/337 R |
| 1,696,343 A | * | 12/1928 | Burdick | ......................... 426/391 |
| 1,973,817 A | * | 9/1934 | Lang | ................................. 99/384 |
| 2,305,014 A | * | 12/1942 | Langel | ......................... 220/23.6 |
| 4,356,995 A | * | 11/1982 | Lohner | .......................... 249/112 |
| 4,882,463 A | * | 11/1989 | Kyougoku et al. | ........... 219/727 |
| 4,960,211 A | * | 10/1990 | Bailey | ........................... 211/60.1 |
| 5,048,402 A | | 9/1991 | Letournel et al. | |
| 5,232,609 A | * | 8/1993 | Badinier et al. | ............... 249/102 |
| 5,445,061 A | * | 8/1995 | Barradas | ......................... 99/340 |
| 5,890,421 A | * | 4/1999 | Smith-Berry et al. | ........... 99/441 |
| 5,967,020 A | * | 10/1999 | Soyama et al. | .................. 99/327 |
| 6,958,168 B2 | * | 10/2005 | Westfield | ....................... 426/503 |
| 7,258,246 B2 | * | 8/2007 | Tingley | ......................... 220/507 |
| 7,565,864 B2 | * | 7/2009 | Hart | ................................. 99/426 |
| 2002/0104443 A1 | * | 8/2002 | Westfield | ........................ 99/327 |
| 2003/0038137 A1 | * | 2/2003 | Tingley | ........................ 220/573.1 |
| 2005/0120891 A1 | * | 6/2005 | Morgan | ........................... 99/426 |

FOREIGN PATENT DOCUMENTS

| | | |
|---|---|---|
| CA | 2060464 A1 | 4/1993 |
| CN | 1071302 A | 4/1993 |
| CN | 1227467 A | 9/1999 |
| DE | 20009006 A | 3/2000 |
| DE | 20021868 U1 | 5/2001 |
| DE | 200216868 A | 5/2001 |
| EP | 0235037 A | 2/1987 |
| FR | 2682262 A1 | 4/1992 |
| GB | 2359981 A | 9/2001 |
| WO | WO 9748282 A1 | 12/1997 |

OTHER PUBLICATIONS

DE20021868U1, Jul. 2001, partial translation.*

* cited by examiner

*Primary Examiner* — Joseph M Pelham
(74) *Attorney, Agent, or Firm* — Browdy and Neimark, PLLC

(57) ABSTRACT

A bread baking support for a baking appliance, the support having at least one mold of elongated shape having a substantially semicircular cross-section. The longitudinal edges of the support have substantially vertical walls.

10 Claims, 6 Drawing Sheets

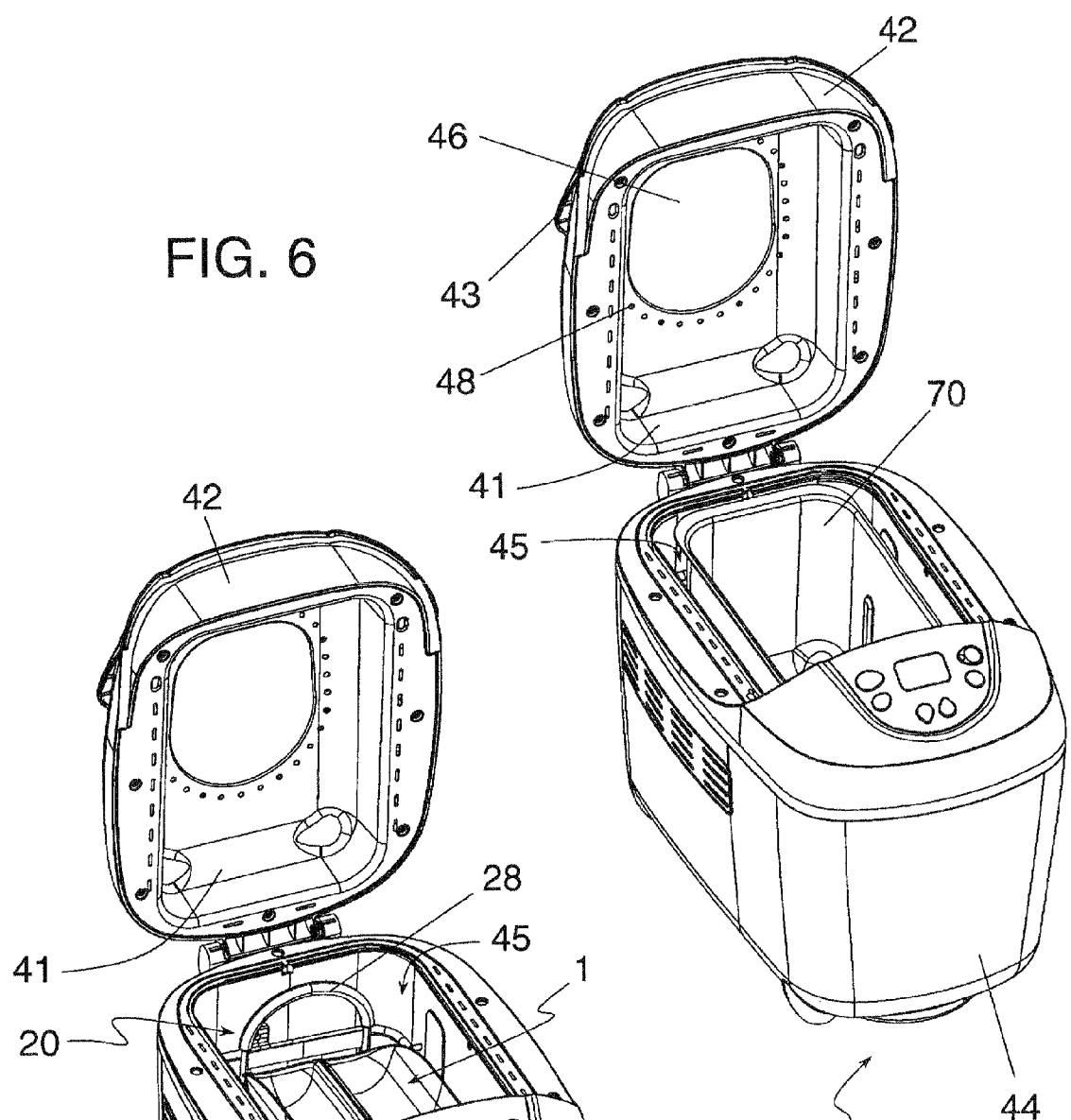

BREAD BAKING SUPPORT AND ASSOCIATED APPLIANCE

BACKGROUND OF THE INVENTION

The present invention relates to the field of home baking appliances comprising a heated chamber, and more particularly to an accessory for baking bread or a similar preparation in such an appliance.

Bread is generally baked in an oven whose chamber can be heated in various ways—by electricity, gas, heating oil, coal, solar energy, etc. The bread dough is generally placed on the hearth of the oven and more or less spreads out onto the hearth during baking.

However, in order to produce baguette-type bread loaves, an elongated mold of semi-circular cross-section can be used to form a so-called molded baguette.

While such an operation has generally been mastered by professionals, it can be different when this type of baking is done in a home setting, where the fairly exacting nature of the various measurements—particularly of the yeast, but also of the quantity of dough placed in the molds—can lead to spillovers of dough during the baking phase. Simple molds of semi-circular cross-section do not prevent dough spillovers.

This drawback is even more substantial when using a bread making machine. In essence, this appliance, which is capable of mixing the various ingredients, then physically transforming them by heat treatment, specifically comprises a baking chamber inside of which is disposed a preparation container and at least one heating element, often positioned inside the lower part of the chamber.

Consequently, a spillover of dough from its baking support can result in contact between the dough and the heating element, which can produce a substantial emission of smoke, or even flames, by burning the dough.

In essence, in such appliances, a number of programs corresponding to different types of bread are available, making it possible to produce a wide variety of breads with a baking process that is defined according to taste and the addition of ingredients such as grains, cheese, diced bacon, raisins, nuts, etc. As many special breads as desired can thus be made with such a machine.

Bread making machines also have multiple functionalities such as the ability to program the preparation of the bread and delay the baking thereof, keep it hot after baking, etc.

The preparation container, which is generally parallelepipedic, contains one or more mixing blades that perform the various mechanical operations for mixing the ingredients and kneading the dough. The container is generally removable to facilitate cleaning, as are the mixing blades of the container.

However, most of the appliances offered use the preparation container for baking the bread, which results in the production of a rather tall, rectangular-shaped bread loaf. While this bread shape is desirable for brioches or sandwich breads, it is not very well adapted to the making of crusty bread, such as baguette-type bread.

There is, however, a machine as described and in U.S. Pat. No. 5,967,020, wherein the container can be replaced by a support made of flat steel sheets for producing round bread products such as bagels—ring-shaped round bread rolls. Such bread products need to be dipped briefly in boiling water before being placed in the oven. The appliance described in that patent thus comprises a steam-producing device which, prior to baking by radiation and convection, allows a moistening and preliminary steam-cooking.

While this appliance certainly makes it possible to bake the dough prepared in the preparation container in another container, the support described does not allow for the production of baguette-type breads. Moreover, the heating element being disposed in the lower part of the baking area, there is uneven baking of the various loaves depending on their position relative to this heating element.

BRIEF SUMMARY OF THE INVENTION

The present invention eliminates the drawbacks described above primarily by providing a novel support for making breads in a bread making machine-type appliance.

The present invention solves the various problems described above by providing a bread baking support for a baking appliance, particularly a bread making machine, the support comprising at least one mold presenting a cavity, of elongated shape having a substantially semicircular cross-section in vertical planes, wherein the longitudinal edges of the support have substantially vertical upwardly extending walls.

Such a support thus makes it possible to produce molded baguettes in traditional ovens or in bread making machines, while the vertical walls considerably reduce the risk of spillover.

Moreover, when such supports are used in a bread making machine, the vertical walls of the support act like heat-protection screens, thus keeping the loaves from overly direct exposure to the radiation from the heating elements of the baking chamber. Such heat-protection screens, however, leave plenty of room for the passage of air so as to allow the bread to be baked essentially by conduction, convection and indirect radiation.

Advantageously, in order to make the best use of the available baking space in a bread making machines, the baking support comprises at least two molds placed side by side along their longest edges.

Advantageously, the maximum depth of each mold is between 20 and 50 mm, which allows for a good balance between the inside, or soft part, and the crust of the bread, which is key to the success of baguette-type breads.

In order to produce baguette-type breads, the length-to-width ratio of each mold is greater than 2, and preferably between 3 and 5. Such a ratio also makes it possible to not substantially modify the current shapes of bread making machines in order to produce the supports.

Through the use of hollow molds of elongated shape, the dough is guided and confined during the baking operation, making it possible to use a relatively large quantity of dough per mold.

Moreover, due to its flared shape, the semicircular cross-section of the mold facilitates the unmolding of the baked bread.

Such a length-to-width ratio also makes it possible to produce relatively short baguettes, whose weight is between approximately 100 and 150 g, such baguettes being well suited to an individual serving of bread.

To facilitate the handling of the support and to hold it in place inside the baking area, its transverse and/or longitudinal edges have a substantially horizontal zone.

The present invention also provides a bread dough baking accessory for a baking appliance, wherein this accessory comprises a metal frame comprising two parallel vertical U-shaped rods, held together by horizontal rods on the bottom part and by transverse plates connecting the vertical branches of the rods, the plates having opposing slots into which can be inserted the ends of a support according to the invention.

Such a structure, by using metal rods, facilitates the circulation of air, making it possible to bake the loaves uniformly, no matter where they are placed. Although this accessory is generally intended for a bread making machine, it can also be used in a traditional oven.

Thus, to optimize the baking space, especially in a bread making machine, the accessory includes four transverse plates disposed opposite each other in pairs so as to constitute means for holding the two supports in place as described above.

Moreover, these four plates also make it possible to block any spillovers of dough at the ends of the supports.

In addition, grasping handles on the top part of the accessory facilitate the handling thereof.

Another subject of the present invention is the embodiment of an electrical baking appliance comprising a baking space, means for heating the baking space and means for regulating the heating means, wherein at least one baking support according to any of the aforementioned features can be placed in the baking space.

Advantageously, the baking support(s) is (are) placed in the baking space by means of a baking accessory according to any of the aforementioned features.

According to one embodiment of the invention, the electrical appliance includes a bread dough preparation space and a removable dough preparation container that can be placed in the preparation space, in association with means for kneading the dough.

Such an appliance is better known as a bread making machine. It has a dough preparation container in which mixing blades are disposed in connection with shafts driven in rotation by a motor. The container and blades being removable, the baking accessory according to the invention can thus advantageously replace the container without any structural modification of the appliance. A new functionality can thus be added at little cost.

According to a preferred embodiment of the invention, the electrical appliance for preparing bread dough and baking the dough is provided with only one space for both the preparation and baking of the dough, making it possible to limit the bulk of the appliance.

However, such an appliance enabling loaves to be baked in a support for producing demi-baguettes requires an adaptation at the level of the production program. The appliance therefore includes a specific program for preparing the dough inside the container using automatic dough kneading and rising cycles, followed by a cycle for baking the loaves placed in the molds of the supports, the start of the baking cycle being contingent upon at least one action by the user on the appliance. Of course, the specific programming required for this operation can easily be created by a programmer according to known programming practice.

In essence, since the preparation is done in the container, the dividing of the dough and the transfer of the loaves into the molds of the supports requires user intervention. Consequently, the program is set to stop just before the baking cycle, in order to allow the loaves to be shaped, and the baking cycle does not start until the user has validated this shaping operation.

This validation may take various forms; it is either done automatically in response to the closing or opening of electrical circuit contacts actuated by insertion of the support or by the accessory, or simply by the user's pressing a button.

During developmental testing of the appliance, it was found that, depending on the vertical position of the supports, the bread would bake differently. In order to improve the homogeneity of the baking, the electrical appliance for preparing bread dough and baking the dough includes two shielded heating elements, one of which is disposed in the lower part of the baking space, the other being disposed in the upper part of the space.

Then, by modifying the power supplied to the various heating elements, it is possible to obtain an even baking of the various loaves, regardless of their position in the baking space.

According to an additional aspect of the invention, in order to facilitate the storage of the accessory for holding the baking support(s), which accessory carries the support(s), the dimensions of this accessory have been designed so that they can be stored inside the dough preparation container with which the appliance is provided, thus making use of the available space inside the container. Thus, this accessory and the associated supports do not take up any additional space when the appliance is not in use.

Other features and advantages of the invention will emerge from the following description in reference to the attached drawings, which are given merely as nonlimiting examples.

BRIEF DESCRIPTION OF THE DRAWINGS

FIGS. 6 and 7 are front perspective views of a bread making machine according to the invention equipped, in FIG. 6, with a preparation and baking container, and in FIG. 7, with a baking accessory comprising the baking supports.

DETAILED DESCRIPTION OF THE INVENTION

Referring to FIGS. 1 through 4, the present invention provides a support 1 for loaves of bread to be baked in a bread making machine. Such a support 1 advantageously comprises two molds 2 of elongated shape, disposed side by side lengthwise and separated from one another by a rim 4.

Figure 1:
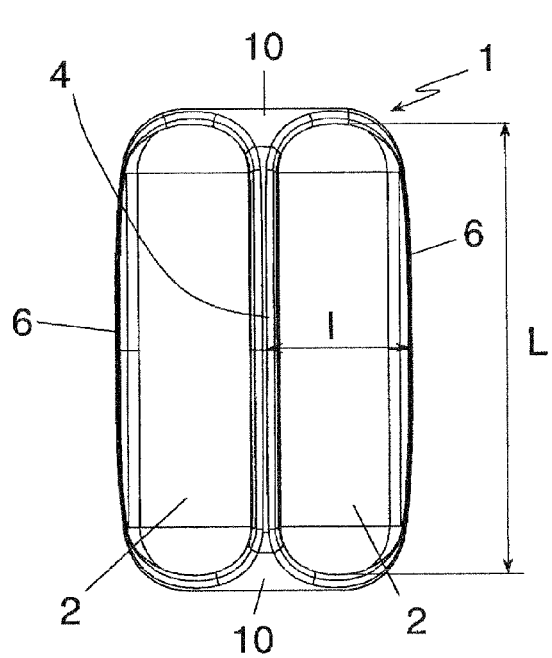
FIGS. 1, 2 and 3 are, respectively, top, side and perspective views of a bread baking support according to the invention for a bread making machine.
Figure 2:
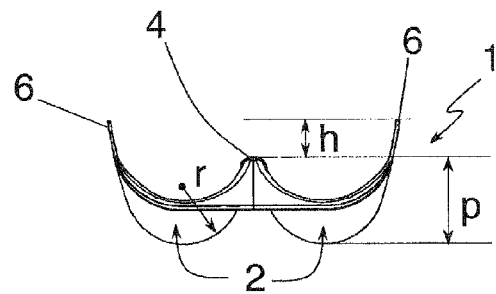

The molds have a length L, a width l, and a maximum depth p, measured from the top of rim 4. As shown in FIG. 2 and in the cross-sectional view of FIG. 11, the molds have a substantially semicircular cross-section, of radius r, in vertical planes, with a value slightly less than the depth p of the molds measured relative to the level constituted by the top of rim 4. Moreover, the ends 8 of the molds also have an arc-shaped longitudinal cross-section in horizontal planes, with a radius substantially identical to the radius r.

According to the proposed example, the length L is around 180 mm, for a width l on the order of 60 mm. The depth p is on the order of 35 mm, and the radius r of the cross-sections of the molds is around 25 mm.

The lateral sides of the support 1 have a flat edge 10, which facilitates the grasping and holding of the supports.

Figure 3:
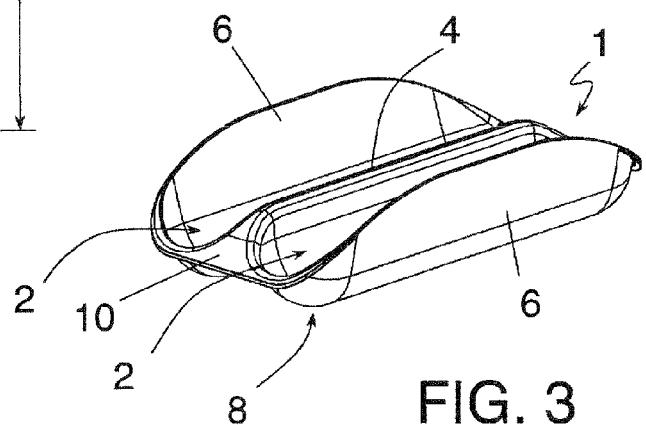

FIGS. 2 and 3 clearly illustrate another aspect of the support according to the invention, i.e. an upward vertical wall 6 constituting a prolongation of the lateral edges of the support. This wall 6 specifically serves as a heat screen during baking, as will be explained below.

The shape of the upper edge of each wall extension 6 is rounded so as to have curved edges that join with the lateral edges of the molds. The maximum height h of these heat screens 6, near the middle of the length of the support and measured relative to the level constituted by the upper edge of rim 4, is on the order of 15 mm.

FIG. 2 also shows that heat screens 6 are slightly inclined toward the outside of the support, in order to facilitate the unmolding of the bread after baking.

Figure 4:
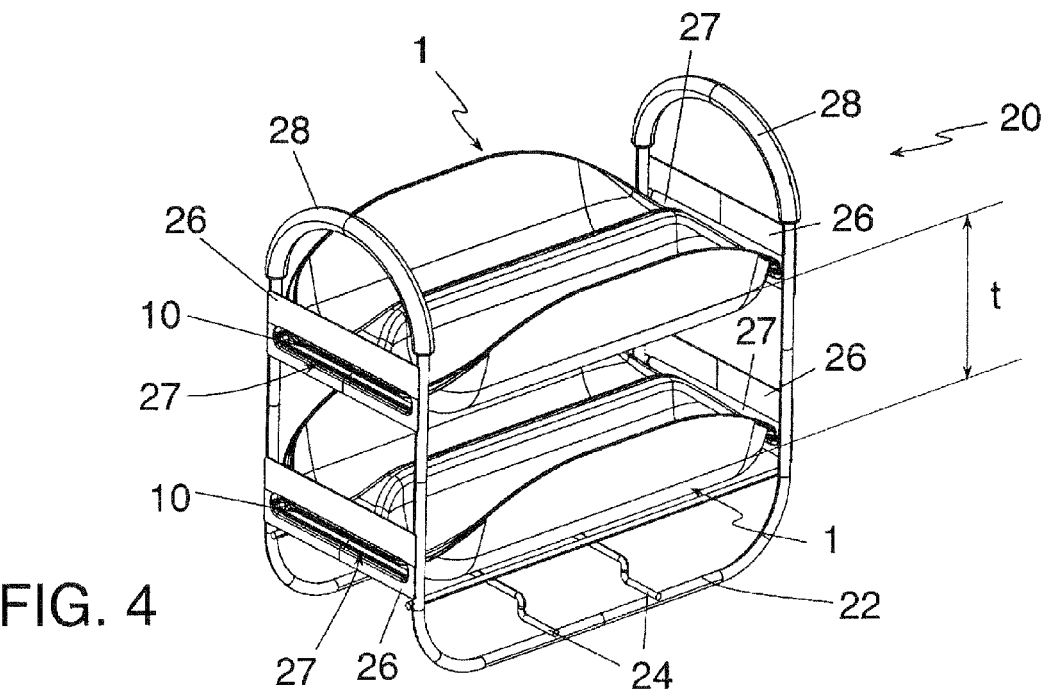
FIG. 4 is a perspective view of a bread baking accessory according to the invention equipped with two baking supports.

FIG. 4 shows the association of two supports 1 as described, with an accessory 20 for holding these supports in place inside a bread making machine.

Such an accessory 20 is composed of two parallel, vertical U-shaped metal rods 22, joined to each other by horizontal rods 24 on the bottom part, and by metal plates 26 connecting the vertical branches of the rods 22. Plates 26 have a vertically oriented width demension and a horizontally oriented length dimension parallel to the width dimension of molds 2. The joints between the rods and the plates are advantageously soldered, but other mechanical joining techniques can also be used, in a variant of embodiment.

According to the proposed exemplary embodiment, the vertical plates 26 for rigidifying the structure of the accessory also fulfill the functions of preventing any spillovers of dough and of holding the supports in place inside the baking space of a bread making machine. These plates are thus disposed at the same level, between two of the vertical branches of each rod 22, the plates having substantially horizontal slots 27, into which can be placed the lateral edges 10 of the supports.

Accessory 20 may also include two longitudinally extending rods (unnumbered), shown just below the lower support 1, to help rigidify the accessory. Supports 1 are put in place and removed by using the elasticity of rods 22 to spread the rods slightly apart so as to slightly increase the distance between the plates 26.

Two handles 28 attached to the ends of the vertical parts of rods 22 facilitate this operation, and also make it easy to handle the accessory.

Furthermore, the two supports 1 are separated by a vertical distance t, which, according to the proposed example, is on the order of 75 mm.

Figure 5:
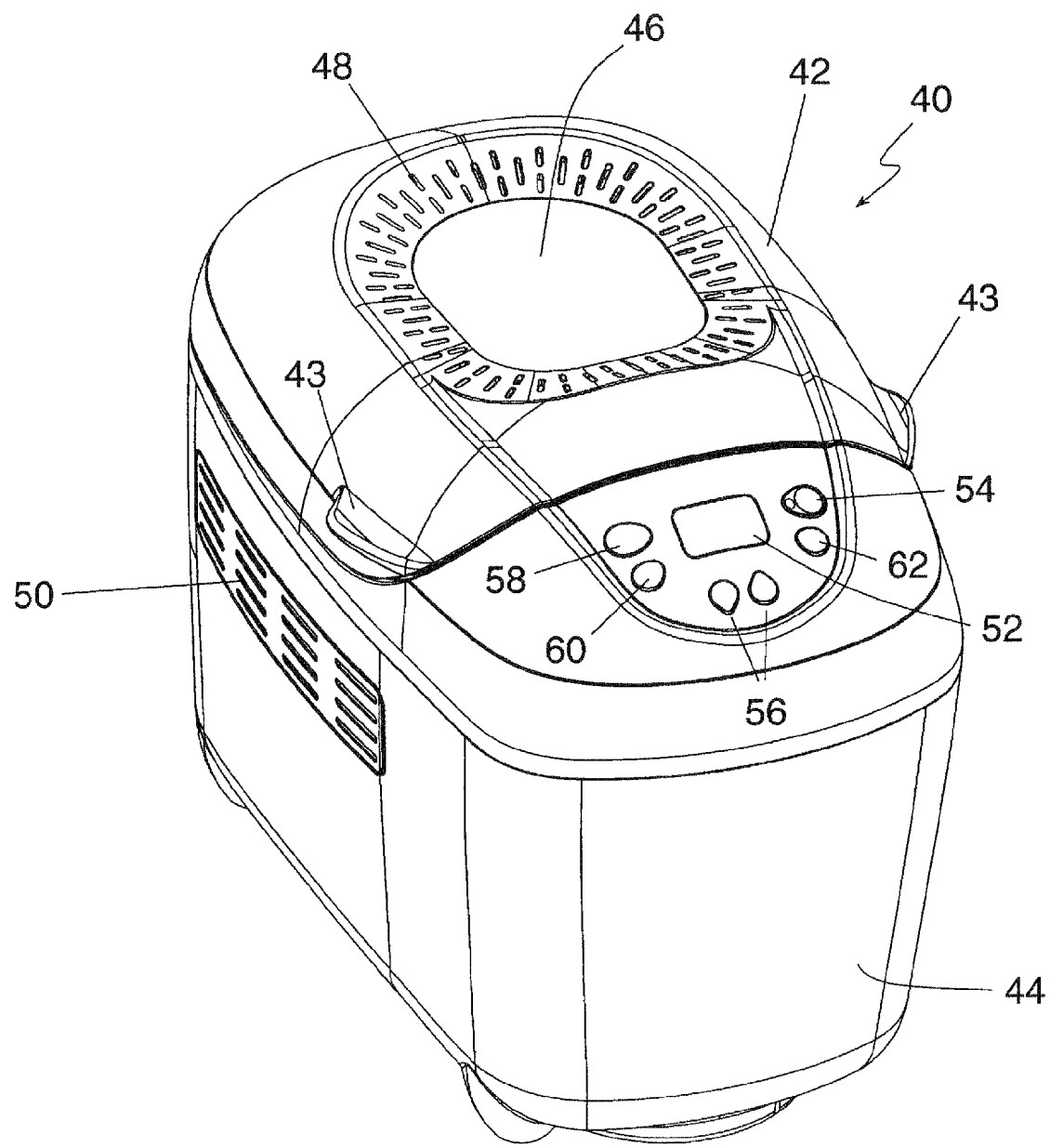
FIG. 5 presents a front perspective view of a bread making machine according to the invention.

Such an accessory is used in a bread making machine 40, as concisely illustrated in FIG. 5. This appliance 40 includes a cover 42 pivotably hinged to a body 44, cover 42, which can be manipulated by handles 43, being equipped with a viewing window 46 and vent holes 48 on the periphery of the window, the vent holes allowing air circulation and the release of baking vapors.

Other vent holes 50 for air circulation are disposed on the lateral edges of body 44 of the appliance.

On the front or top face of appliance 40 is a control panel, as it is known in such appliances. This panel comprises a display 52 and an on/off button 54. Additional buttons 58, 60, 62 make it possible to select a specific bread making program. Such programs make it possible to generate phases for mixing and kneading the ingredients by means of the blades disposed inside the container, followed by a baking phase. Some programs perform only the mixing and kneading phases.

Some of the buttons 58, 60, 62 are used to adjust the various parameters that influence the baking process (particularly weight and desired degree of browning). A delayed start can also be selected, since the buttons 56 make it possible to adjust the time at which the baking stops. The required control operations can be in accordance with what is already known in the art.

According to the invention, the appliance includes a specific program, created in accordance with principles already known in the art, hereinafter called the "baguette" program, which makes it possible to use the accessory as explained below.

The inside of the appliance comprises a parallelepiped shaped preparation and baking space 45, as it is known in this type of appliance, this space being accessible after cover 42 is opened, as shown in FIGS. 6 and 7.

Figure 8:
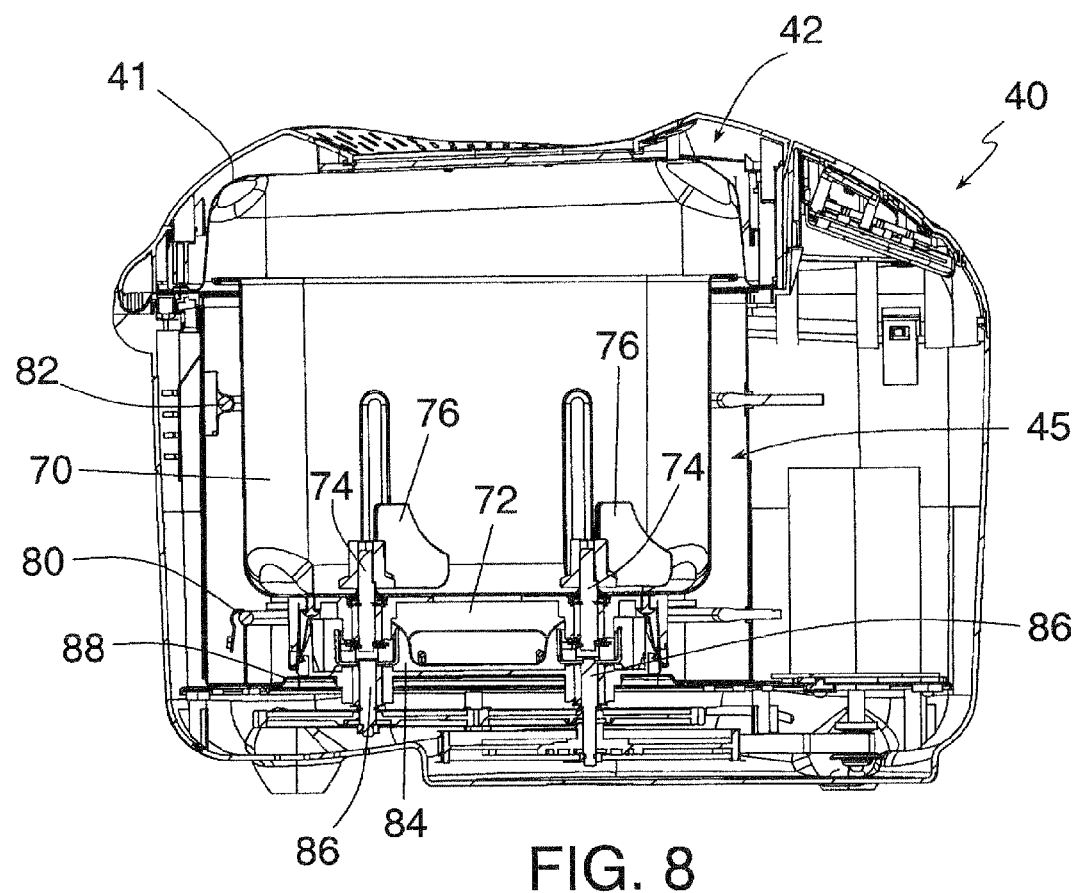
FIGS. 8 and 9 present cross-sectional views of the appliance equipped with the preparation and baking container, respectively in longitudinal and transverse cross-section.
Figure 9:
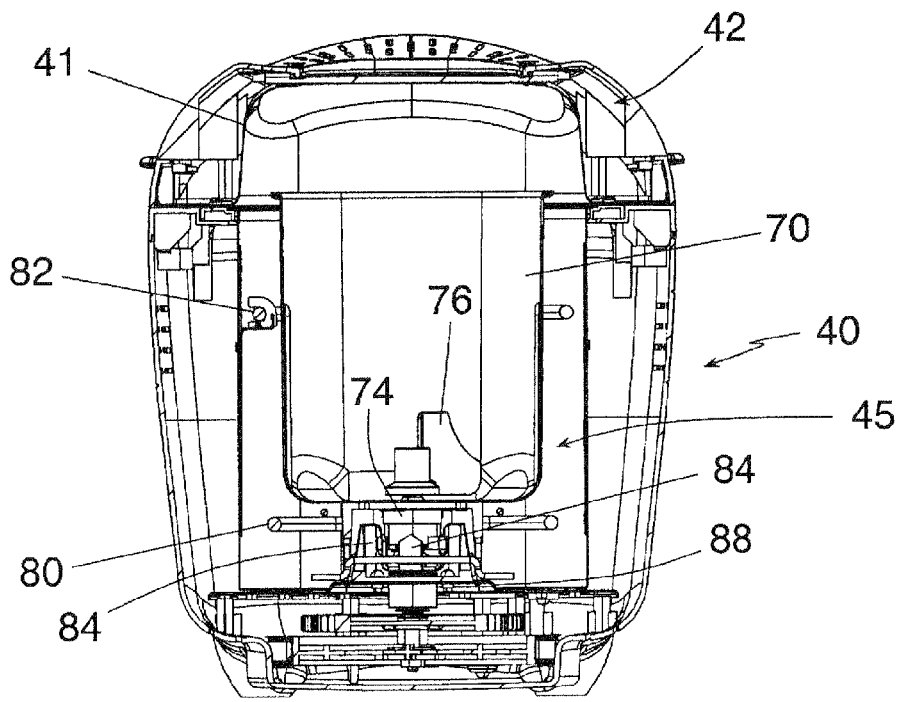

This space 45 is conventionally occupied by a baking container 70, as seen in FIGS. 6, 8 and 9. Two shielded heating elements 80, 82 disposed on the inside periphery of the housing of the container, element 80 in the lower part and element 82 in the upper part, provide the necessary heating of the preparation and baking space 45 during the various bread making steps, including the baking step.

The illustration of the appliance in FIG. 6, in which the cover 42 has been opened by pivoting about a pin disposed at the back of the appliance, makes it possible to see a heat screen 41 positioned on the inside top and side faces of the cover, except for window 46 and vents 48, for the purpose of protecting the outer casing of the cover, which is made of plastic. This aspect is even more important when the appliance according to the invention has a heating element 82 in the top part of the baking space 45.

FIGS. 8 and 9 show the positioning of the container 70, equipped with blades 76, inside the preparation and baking space 45 of the appliance. As is known in this type of appliance, the container has a parallelepiped shaped base 72 that cooperates with a pedestal 84 connected to the appliance and disposed in the bottom part of the preparation and baking space. Base 72 of the container and pedestal 84 cooperate by elastic locking by means of spring blades on the lateral edges of the mounting, as is known in the art.

This cooperation makes it possible to align the shafts 74 of the blades with pinions 86 for driving the blades, joined to body 44 and projecting slightly into space 45.

Figure 10:
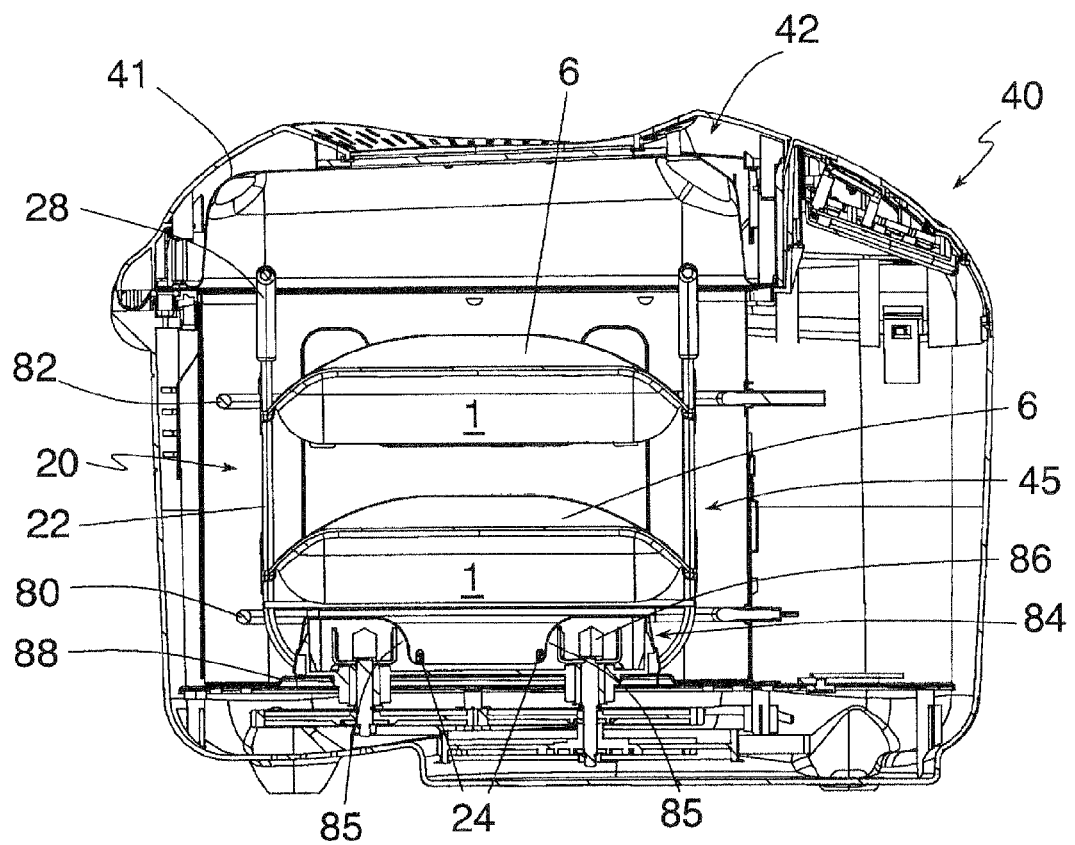
FIGS. 10 and 11 are views similar to FIGS. 8 and 9, the appliance in this case being equipped with a baking accessory comprising the baking supports according to the invention.
Figure 11:
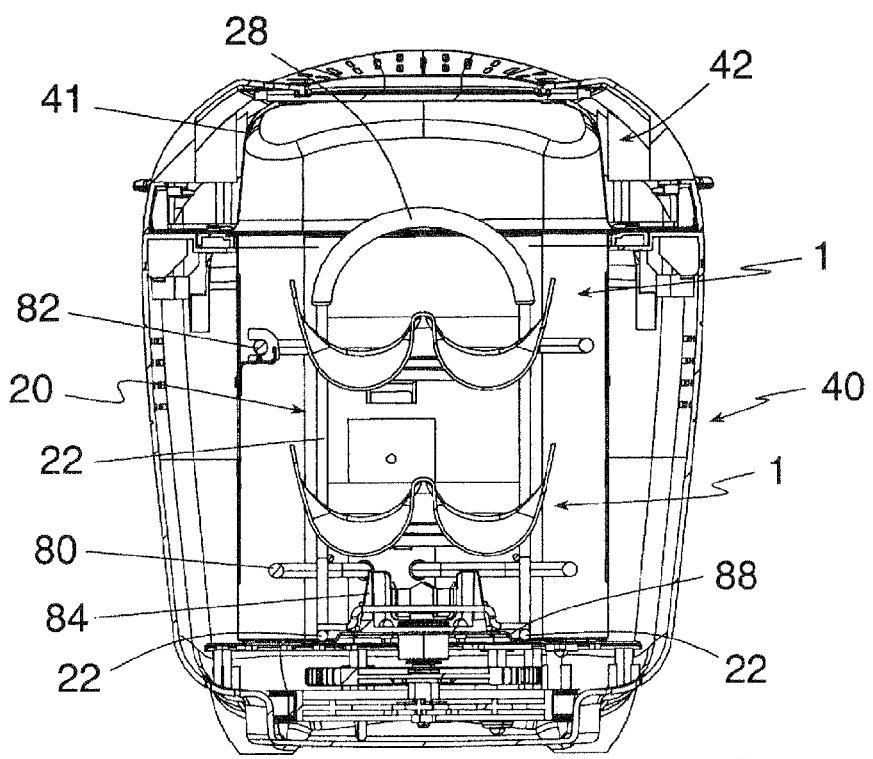

According to the invention, and as illustrated in FIGS. 7, 10 and 11, accessory 20, equipped with one or two supports 1, can be placed in the baking space in place of container 70.

The two rods 22 then rest on the horizontal bottom that delimits the preparation and baking space 45 of the appliance. FIGS. 10 and 11—and especially FIG. 12, which is a view showing mainly the bottom of baking space 45, pedestal 84 and accessory 20—specifically show that the receiving pedestal 84 of the container is disposed on a slightly raised portion 88 of the bottom of the housing. The size of this raised portion, which is a few millimeters high, is designed to make it possible to laterally guide the accessory into position by the horizontal bottom part of the rods 22, which are positioned on either side of the raised portion 88 so as to center the accessory relative to the heating elements.

Figure 12:
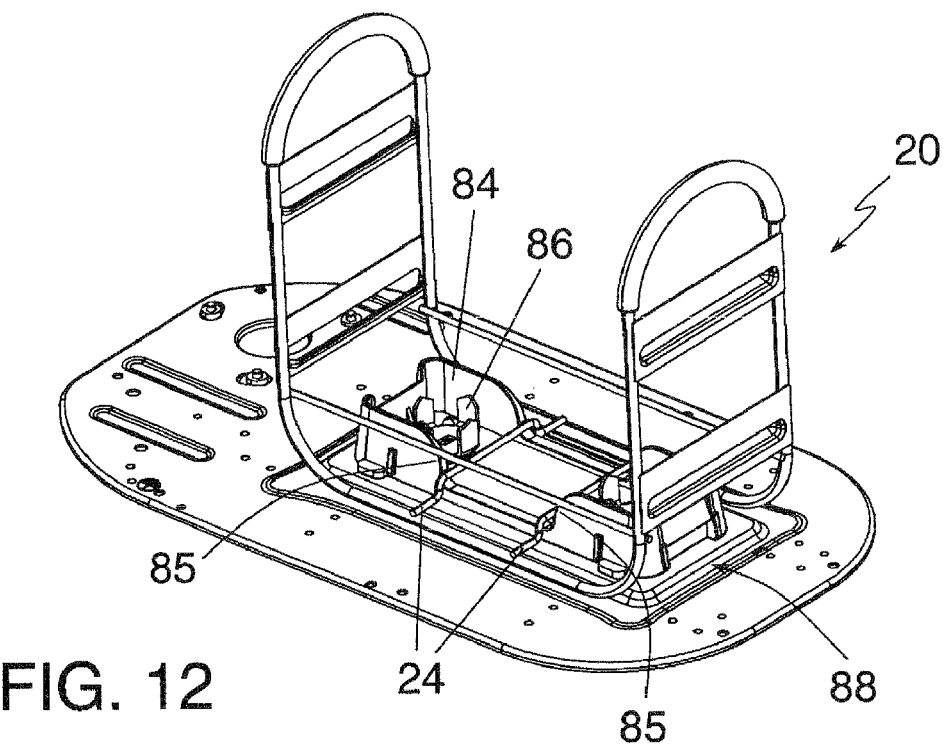
FIG. 12 presents a perspective view of the arrangement of certain elements of the bread making machine according to the invention.

Accessory 20 is guided longitudinally by cooperation between transverse rods 24 of accessory 20 and sloping edges 85 provided in pedestal 84, the sloping edges creating a recess in the two vertical walls of the longitudinal edges of pedestal 84, as may be clearly seen in FIG. 12.

With the accessory thus positioned in the space 45, the upper heating element 82 is positioned slightly below the level of the rim 4 that separates the two molds of the upper support, while the lower heating element 80 is located slightly beneath the lower support.

In operation, when the user wishes to make bread using accessory 20 as illustrated, he first places the container 70 and the appropriate ingredients into the appliance and closes the cover. Then, using the buttons 58, he selects a "baguette" program, which he adjusts using the buttons 60, 62. A delayed start may be selected using the buttons 56.

The user then starts the various kneading and, if needed, rising cycles for the dough by pressing the button 54.

When the various kneading and rising cycles are finished, the appliance indicates the end of the preparation of the dough with beeping sounds, which may or may not be associated with indicator lights, and goes on standby.

The user must then remove container 70 from the appliance and divide the dough—possibly using a scale—into different loaves weighing on the order of 125 g, which he then places in molds 2 of supports 1, after which supports 1 are then installed in accessory 20.

Accessory 20 is then placed inside the appliance in place of container 70, in space 45. The correct positioning of accessory 20, as explained above, is facilitated by the gentle slope provided by raised portion 88, and by the curvature of sloping edges 85, which allow accessory 20 to be guided into position, the accessory being positioned automatically by "sliding" along these various slopes and curves.

The user, after having closed cover 42, indicates to the appliance that the baking cycle may begin by pressing button 54. Other means may be provided for starting the baking cycle, for example a means for detecting the presence of the accessory and the closing of the cover. The baking cycle starts with a dough rising phase followed by a baking phase.

Heating elements 80, 82 being disposed on the periphery of the baking space, the latter is heated by convection and radiation. The presence of heat screens 6 on the longitudinal edges of supports 1 thus substantially shields the loaves placed in the upper support from the direct radiation emitted by upper heating element 82. This radiation is not completely eliminated, particularly on the lower loaves, and thus contributes to the browning of the crust. This browning is thus essentially produced by direct radiation for the lower loaves and by indirect radiation for the upper loaves.

It is important to note that the wire structure of the accessory leaves plenty of room for air circulation, thus promoting heat exchanges and even baking of the bread. The size of plates 26 for rigidifying accessory 20 and holding supports 1 in place is therefore small in order to allow a substantial flow of air between them.

Thus, the radiation from the lower heating element is essentially absorbed by the lower part of the supports, which are preferably made of steel with a nonstick coating in contact with the bread, while the upper resistive heating element makes it possible to bake the tops of the baguettes primarily by direct and indirect radiation.

The containment of baking space 45, the positioning of heating elements 80, 82, the shape of supports 1—particularly the curved shape of walls 6—and the distance t between the two supports 1 are thus carefully chosen to ensure even and homogeneous baking of the various loaves.

Furthermore, the use of two heating elements makes it possible to modify or adjust the power by independently controlling both the power and the operating time of each heating element.

It is thus possible to start the baking cycle at maximum power, which allows the container to be brought to the desired baking temperature very quickly, thus simulating the placement of the bread into a hot oven that is advantageous for bread baking, and to then reduce this power in order to avoid burning the bread.

A heat screen may be disposed underneath the top heating element in order to limit the direct radiation on the loaves disposed in the bottom part, or lower support 1.

According to the disclosed exemplary embodiment of the invention, the two heating elements are cycled so as to produce long wavelength radiation, in order to obtain a bread surface temperature below 600° C., which ensures the browning of the crust without burning, the temperature inside the baking space being on the order of 185° C.

It is also possible to have upper heating element 82 operate at full power for several minutes at the end of the baking cycle, in order to finish browning the bread.

At the end of the baking cycle, the appliance indicates with beeping sounds that the baguettes are done and cuts off the power supply to the heating elements. The user can then remove accessory 20 from the baking space, holding it by handles 28.

Figure 13:
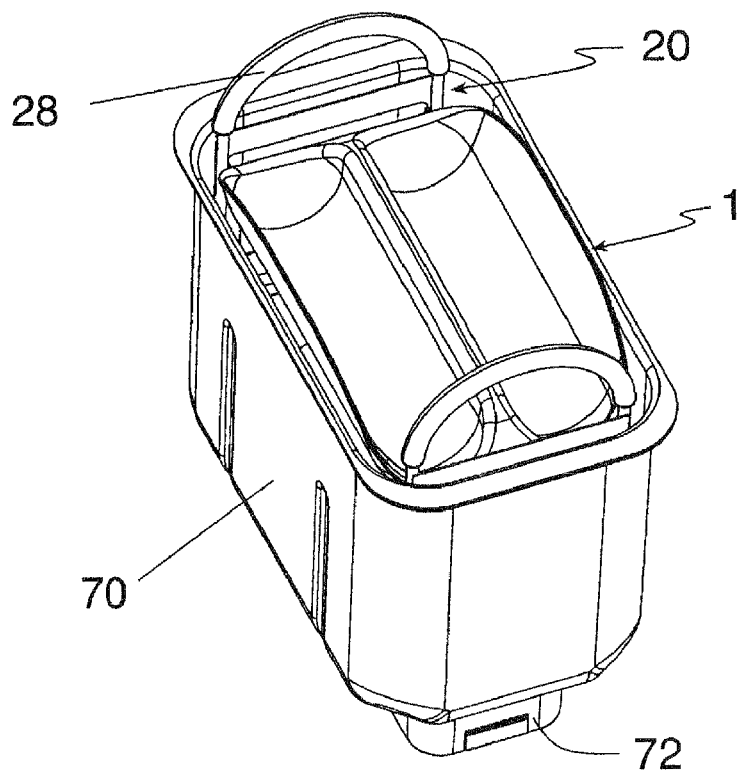
FIG. 13 presents a perspective view of the storage of the baking accessory inside the container.

According to another aspect of the invention, as illustrated in FIG. 13, the storage of accessory 20 is facilitated by the fact that its dimensions are designed so that it can be completely housed inside container 70. Only the handles 28 project slightly from the top part. The assembly can thus be positioned inside the appliance ready to be used again, since the handles 28 do not interfere with the closing of the cover 42. Blades 76 and shafts 74 can also be stored inside container 70, along with accessory 20 and supports 1.

The present invention is not limited to the illustrated embodiment alone and may comprise many variants of embodiment.

In fact, each support for the loaves may comprise a different number of molds than the number presented, depending on the available space. The number of supports placed in the baking space may also vary depending on the available space.

The supports can also be placed directly inside the baking chamber, in association with the interior walls of the baking chamber, without a specific holding accessory.

The accessory for holding the supports in place can have support holding means other than those presented, for example joined by clipping.

Moreover, the supports can be held in place on the accessory by their transverse edges.

With respect to the preparation and baking appliance, while many appliances do have only one space for both preparation and baking, the appliance according to the invention is not limited to just one space and can thus include several preparation and/or baking spaces, which can be controlled independently from one another.

In addition, various means can be used to improve the baking of the loaves. Thus, forced convection heating may be used, thus avoiding the risks of burning the bread by direct radiation from heating elements like those described, which require the supports to be equipped with heat screens. This configuration, however, does not eliminate the brief use of radiation in order to give the bread a good browning.

It is possible to provide for the presence of a humid environment in the baking chamber, in which case a dish filled with water is disposed in one of the spaces left open by the accessory when the latter is inserted into the appliance.

Moreover, although this specification has provided a detailed description of only one support disposed in a bread making machine, the present invention also applies to household baking ovens, in which the support may be placed inside the oven chamber, on a rack or a baking sheet. Such a support can also have more varied geometries, due to the larger space available in the oven chamber. The support may specifically include a number of molds placed side by side, and the length of each mold may be slightly longer than that described above. The presence of vertical walls at the level of the longitudinal edges of the supports is still necessary, however, in order to avoid spillovers of dough.

This application relates to subject matter disclosed in French Application number FR-07 05556, filed on Jul. 30, 2007, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A bread baking accessory for a baking appliance, said accessory being composed of a metal frame comprising: two parallel vertically extending U-shaped rods each having a bottom part and two vertical branches; horizontally extending rods connected to said bottom part for holding said two vertically extending U-shaped rods together; and transverse plates each connecting a vertical branch of one of said vertically extending U-shaped rods to a vertical branch of the other one of said vertically extending U-shaped rods, said plates having slots into which can be inserted ends of a bread baking support that includes at least one mold having a length dimension that imparts an elongated shape to the mold, the mold having a substantially semicircular cross-section in vertical planes, and the support having longitudinal edges and vertical walls that each extend to a respective longitudinal edge.

2. The bread baking accessory according to claim 1, wherein said transverse plates comprise four transverse plates disposed opposite each other in pairs so as to constitute means for holding two of the bread baking supports in place.

3. The bread baking accessory according to claim 1, said accessory having a top part and further comprising grasping handles on said top part.

4. An electrical baking appliance comprising: an enclosure delimiting a baking space; means for heating said baking space; means for regulating said heating means, in combination with a baking support comprising at least one mold presenting a cavity having a length dimension that imparts an elongated shape to said mold, said mold having a substantially semicircular cross-section in vertical planes and upwardly extending ends transverse to the length dimension; and said support having longitudinal edges and vertical walls that each extend to a respective longitudinal edge, said support being dimensioned to be placed inside said baking space, in combination with a bread baking accessory that is dimensioned to be inserted into said baking space, said accessory being composed of a metal frame comprising: two parallel vertically extending U-shaped rods each having a bottom part and two vertical branches; horizontally extending rods connected to said bottom part for holding said two vertically extending U-shaped rods together; and transverse plates each connecting a vertical branch of one of said vertically extending U-shaped rods to a vertical branch of the other one of said vertically extending U-shaped rods, said plates having slots into which can be inserted ends of said bread baking support wherein said support can be placed in said baking space together with said accessory.

5. The electrical appliance according to claim 4, wherein said enclosure also delimits a dough preparation space, and said appliance further comprises: a removable dough preparation container that can be placed inside said preparation space; and means for kneading dough in said dough preparation container.

6. The electrical appliance according to claim 5, wherein said enclosure delimits only one space constituting both said preparation space and said baking space.

7. The electrical appliance according to claim 6, wherein said appliance is provided with a specific program for preparing dough inside said dough preparation container using automatic dough kneading and rising cycles, followed by a cycle for baking a loaf placed in said at least mold of said support, the start of the baking cycle being contingent upon at least one action by the user on said appliance.

8. The electrical appliance according to claim 5, wherein said appliance is provided with a specific program for preparing dough inside said dough preparation container using automatic dough kneading and rising cycles, followed by a cycle for baking a loaf placed in said at least mold of said support, the start of the baking cycle being contingent upon at least one action by the user on said appliance.

9. The electrical appliance according to claim 5, further comprising two shielded heating elements, one of said heating elements being disposed in a lower part of said baking space, and the other of said heating elements being disposed in an upper part of said baking space.

10. The electrical appliance according to claim 5, wherein said accessory, when equipped with said baking support, can be stored inside said dough preparation container.

* * * * *